United States Patent
Dolph

(10) Patent No.: US 8,818,844 B2
(45) Date of Patent: Aug. 26, 2014

(54) INCENTING VIEWERS TO REMAIN WITH THEIR CURRENT DIGITAL MEDIA CONTENT

(75) Inventor: Blaine H. Dolph, Western Springs, IL (US)

(73) Assignee: International Business Machines Corporation, Armonk, NY (US)

( * ) Notice: Subject to any disclaimer, the term of this patent is extended or adjusted under 35 U.S.C. 154(b) by 1530 days.

(21) Appl. No.: 11/369,553

(22) Filed: Mar. 7, 2006

(65) Prior Publication Data

US 2007/0214038 A1 Sep. 13, 2007

(51) Int. Cl.
*G06Q 30/00* (2012.01)
*G06Q 30/02* (2012.01)

(52) U.S. Cl.
USPC ..................... 705/14.11; 705/14.35

(58) Field of Classification Search
USPC ........................... 705/14.11, 14.35
See application file for complete search history.

(56) References Cited

U.S. PATENT DOCUMENTS

| | | |
|---|---|---|
| 5,483,276 A | 1/1996 | Brooks et al. |
| 6,049,779 A | 4/2000 | Berkson |
| 6,061,660 A | 5/2000 | Eggleston et al. |
| 6,690,779 B2 | 2/2004 | Walker et al. |
| 6,807,532 B1 | 10/2004 | Kolls |
| 6,862,594 B1 | 3/2005 | Saulpaugh et al. |
| 7,269,835 B2 * | 9/2007 | Swix et al. ...................... 725/23 |
| 7,840,975 B2 | 11/2010 | Matheny et al. |
| 2002/0013942 A1 | 1/2002 | Kim |
| 2003/0050834 A1 | 3/2003 | Caplan |
| 2004/0205810 A1 * | 10/2004 | Matheny et al. ................. 725/23 |
| 2006/0080700 A1 * | 4/2006 | Weinblatt ........................ 725/23 |

FOREIGN PATENT DOCUMENTS

WO  WO0152173  *  7/2001  .............. G06F 19/00

* cited by examiner

*Primary Examiner* — John Van Bramer
(74) *Attorney, Agent, or Firm* — Yee & Associates, P.C.; Arthur J. Samodovitz

(57) ABSTRACT

A system, method, and computer program by which a content provider can display an incentive for a user to remain with their current channel or program. When the user attempts to leave the current program, a pop-up window containing an incentive to remain with the current program is displayed. The user must respond to the pop-up window in order to proceed, whether the user chooses to leave or remain with the current program.

7 Claims, 4 Drawing Sheets

```
<config>
    <Program>Tonight Show with Jay Leno</Program>
    <Incentive start = "0" end = "120">Brad Pitt will be making a surprise
    appearance in 10 minutes</incentive>
    <Incentive start = "2400" end = "3000"> You will miss Dave Matthews
    Band playing their new song</incentive>
</config>
```

402 — `<Program>Tonight Show with Jay Leno</Program>`
404 — `<Incentive start = "0" end = "120">Brad Pitt will be making a surprise appearance in 10 minutes</incentive>`
406 — `<Incentive start = "2400" end = "3000"> You will miss Dave Matthews Band playing their new song</incentive>`

*FIG. 4A*

| TIME (SEC.) | INCENTIVE |
|---|---|
| 0-120 | BRAD PITT WILL BE MAKING A SURPRISE APPEARANCE IN 10 MINUTES |
| 121-2399 | NULL |
| 2400-3000 | YOU WILL MISS DAVE MATTHEWS BAND PLAYING THEIR NEW SONG |
| 3001-3599 | NULL |

*FIG. 4B*

```
<config>
    <Program>Infomercial</Program>
    <Incentive start = "120" end = "1200">Watch for 2 more minutes and you'll
    receive 10% off<incentive>
    <Incentive start = "1200" end = "1800">Order now and receive two for the
    price of one</incentive>
</config>
```

424 — `<Program>Infomercial</Program>`
426 — `<Incentive start = "120" end = "1200">Watch for 2 more minutes and you'll receive 10% off<incentive>`
428 — `<Incentive start = "1200" end = "1800">Order now and receive two for the price of one</incentive>`

*FIG. 4C*

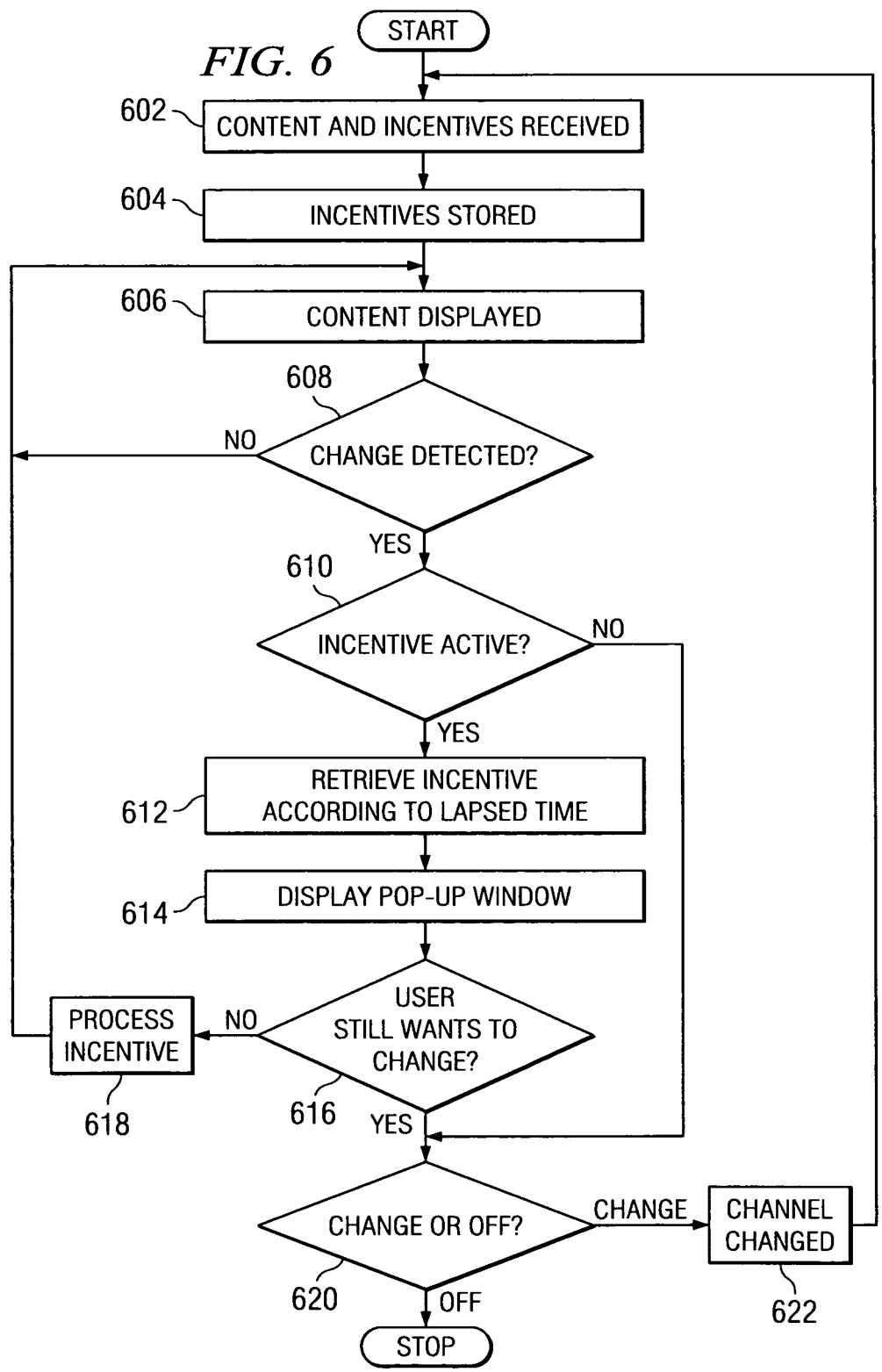

INCENTING VIEWERS TO REMAIN WITH THEIR CURRENT DIGITAL MEDIA CONTENT

BACKGROUND OF THE INVENTION

1. Field of the Invention

The present invention relates generally to a system, method, and computer program for providing advertising, especially for advertising the advantages of remaining with a given broadcast channel. More specifically, the invention relates to retaining viewers on a specific broadcast channel through the use of incentives.

2. Description of the Related Art

A viewer sitting down to watch television can be faced with hundreds of channels from which to choose. Thus, anyone who provides content for broadcast, whether the content is news, regular televised programming, special events such as Olympic coverage, a movie, or an infomercial, must face the reality of an enormous amount of competition. Users may switch programs because of boredom, impatience, or a multitude of other reasons. The content provider, on the other hand, hopes to retain the viewer throughout the entire program to improve ratings and retain sponsors. In order to retain users who attempt to leave, it would be desirable to be able to provide enticements for the user to remain with a current program.

SUMMARY OF THE INVENTION

The present invention provides a system, method, and computer program by which a content provider can display an incentive for a user to remain with their current channel or program. When the user attempts to leave the current program, a pop-up window containing an incentive to remain with the current program is displayed. The user must respond to the pop-up window in order to proceed, whether the user chooses to leave or remain with the current program.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an exemplary embodiment when read in conjunction with the accompanying drawings, wherein:

FIG. 4A shows an XML file used to transmit incentives for a given program in an exemplary embodiment of the present invention;

FIG. 4B shows a table used to store the incentives in an exemplary embodiment of the present invention;

FIG. 4C shows an XML file used to transmit incentives for an infomercial in an exemplary embodiment of the present invention;

FIG. 6 shows a flowchart of a process for providing an incentive to a user in a broadcast system, in accordance with an exemplary embodiment of the present invention.

DETAILED DESCRIPTION OF THE PREFERRED EMBODIMENT

Figure 1:
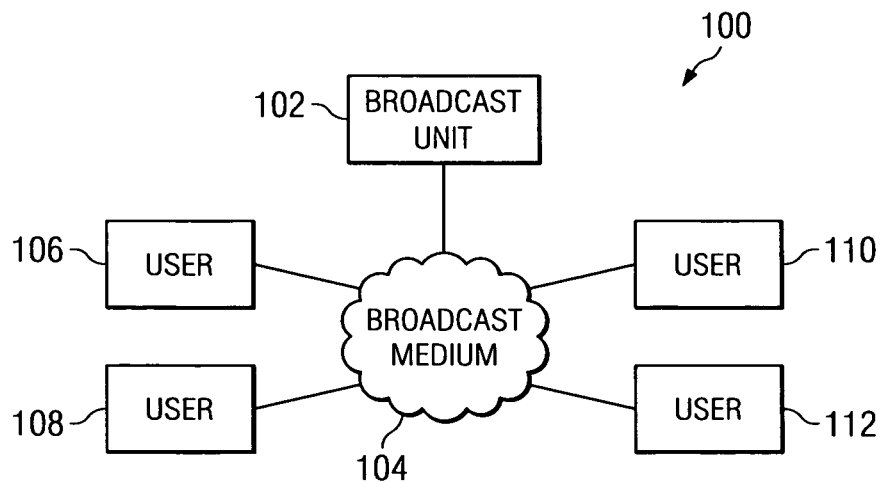
FIG. 1 shows a broadcast system in which aspects of the present invention may be implemented according to an exemplary embodiment of the invention.

With reference now to the figures and in particular with reference to FIG. 1, an exemplary diagram of a broadcasting system is provided in which an embodiment of the present invention may be implemented. It should be appreciated that FIG. 1 is only exemplary and is not intended to assert or imply any limitation with regard to the environments in which aspects or embodiments of the present invention may be implemented. Many modifications to the depicted environments may be made without departing from the spirit and scope of the present invention.

FIG. 1 depicts broadcast system 100 in accordance with an exemplary embodiment of the present invention. Broadcast unit 102 provides content, such as news, weather, entertainment, infomercials, etc. using a specific broadcast medium 104. In the present context, content is taken to mean the topics or matter treated in an audiovisual program that is presented to the user. The content discussed in the present disclosure is provided primarily, but not exclusively, by a broadcast medium. For example, content may also be presented from a storage medium, such as a tape or DVD. Broadcast medium 104 can be standard broadcast, cablecast or satellite transmission, or other form of data transmission. User devices 106, 108, 110, and 112 are connected to receive broadcast medium 104 to provide their users access to content provided by broadcast unit 102.

Figure 2:
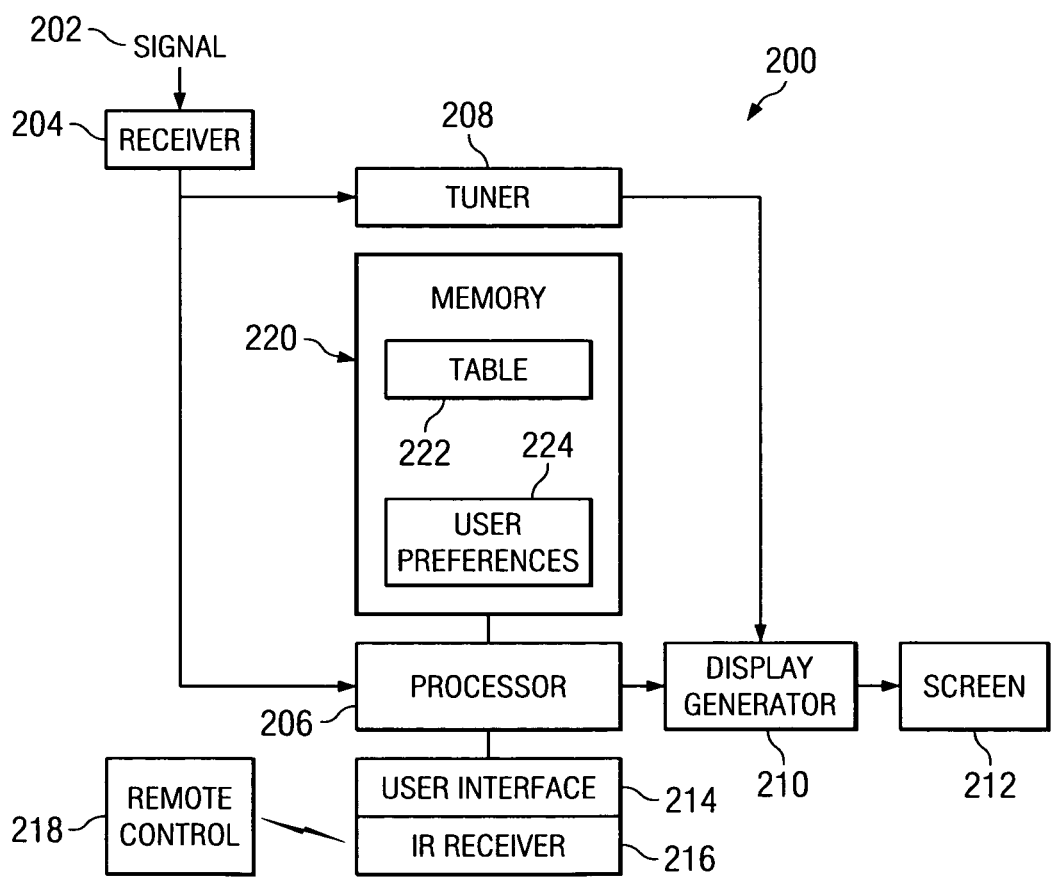
FIG. 2 shows a block diagram of a receiving device for a broadcast media in which aspects of the present invention may be implemented according to an exemplary embodiment of the invention.

With reference now to FIG. 2, a block diagram of the components of a receiving device 200 for a broadcast medium is shown in which an exemplary embodiment of the present invention may be implemented. Receiving device 200 is exemplary of user devices 106, 108, 110, and 112 in FIG. 1. Receiver 204 is configured to receive input signal 202, which is a broadcast data stream from a content provider, such as broadcast unit 102. Input signal 202 contains, for example, programming of interest to users within the geographical region that receives input signal 202. Input signal 202 also contains metadata that provides additional information about the programming, such as the name of the program, the length of the program, and a table of user incentives, which will be described in greater detail later.

In an exemplary embodiment, input signal 202 is transmitted on a cable line and carries a large number of channels. In the example shown, when receiver 204 has acquired signal 202, the received signal is split and goes both to processor 206 and to tuner 208, each of which provides output to display generator 210. Tuner 208 will separate a desired channel from the multiple broadcast channels and send the output to display generator 210.

Processor 206 receives signal 202 and extracts metadata, including incentives for the user. In an exemplary embodiment, the metadata is provided as a header at the beginning of a program, although other formats may also be used to distribute metadata. Processor 206 stores the metadata in memory 220 for later use; the incentives are stored in table 222, as will be described below. Memory 220 additionally contains a user preference area 224. User preference area 224 stores information regarding user preferences, including preferences that relate to the present invention. For example, not everyone would want to receive the disclosed incentives. An incentives setting in user preference area 224 stores a user choice to receive or not to receive incentives; this setting can be toggled on or off through use of a menu, as is known in the art. Additionally, the means by which a user indicates "Yes" and "No" in response to an incentive is preferably a configurable option. For example, the arrows on a remote control that control volume can be designated for responses, e.g., the increase volume button means "Yes" and the decrease volume button means "No". These settings can be stored in user preference area 224.

Processor 206 is connected to display generator 210 to provide additional display information to the programming provided. For example, processor 206 provides a menu display, volume control display, and the disclosed user incentives.

Display generator 210 may be a commercially available VGA-type graphics card containing a standard RGB video generator, which converts a data signal received from processor 206 into an RGB format for screen 212. Display generator 210 also includes a video overlay device, which accepts both the RGB input passed from processor 206 and the input from tuner 208. The overlay device combines the formatted display from processor 206 with the signal from tuner 208, and produces a composite output signal containing both the program signal and any overlays provided from processor 206. This composite signal is supplied to screen 212, which is a television screen in at least one embodiment.

User interface 214 is connected to receiving device 200 to receive user input; user interface 214 is connected to processor 206 and to infrared (IR) receiver 216. In turn, IR receiver 216 is configured to receive a signal from remote control 218, which receives user input. The user manipulates buttons or keys on remote control 218 to send instructions via IR receiver 216 on user interface 214.

The components identified in connection with FIG. 2 can be implemented, for example, in a cable converter box equipped with a microprocessor and memory; in an alternate embodiment, the components can be implemented in an IBM personal computer equipped with a transmission link and a video graphics card.

Using the hardware shown in FIGS. 1 and 2, the present invention provides a system, method, and computer program by which a content provider can display an incentive for a user to remain with their current channel or program. When a user device receives a program, the user device also receives metadata describing the program or programs. Metadata can describe the type of presentation (e.g., movie or infomercial), title, length of presentation, and any other desirable information. The inventive method stores incentives and when the user attempts to change the channel or turn off the television, the inventive method displays the incentive(s). The incentives may be teasers, specific information about what is coming up in the program or later on the channel, a specific discount if the user continues to watch the program, etc. Further, the incentives may be global for the specific program or incentives may be tied to the elapsed time of the program. When an incentive is displayed, the user must respond to the message in order to continue in the course of action they chose.

Figure 3:
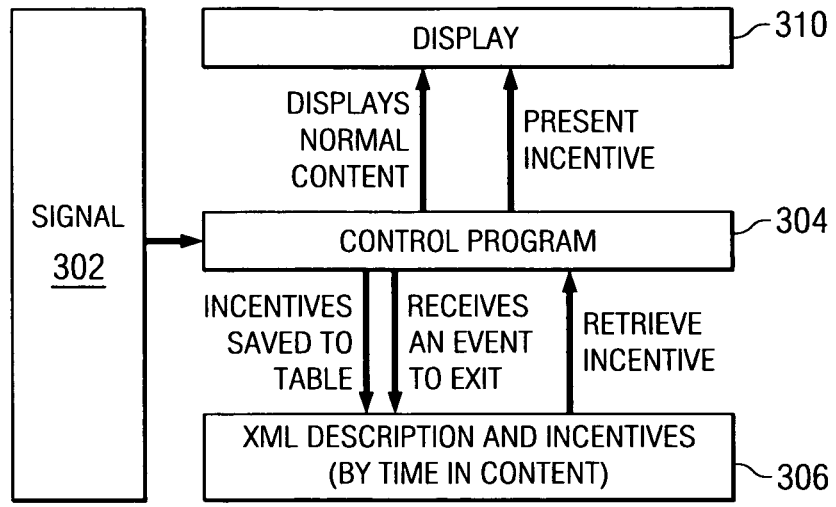
FIG. 3 illustrates the flow of content and metadata used to provide incentives in an exemplary embodiment of the present invention.

With reference now to FIG. 3, an illustration is provided of the flow of content and metadata used to provide incentives in an exemplary embodiment of the present invention. Signal 302 corresponds to signal 202 of FIG. 2 and contains both content and metadata. Content consists of the programming being provided to the user. Content contained on signal 302 may contain, for example, news, sporting, documentary, movie, infomercial, educational programming, or any other variety of audiovisual presentation that is broadcast to users. In an exemplary embodiment of the present invention, signal 302 contains incentives and their associated time ranges in addition to the content, either as a header at the beginning of the transmission of a program or interleaved with the content. Control program 304, in an exemplary embodiment executes on processor 206 of FIG. 2. When control program 304 receives content 302, control program 304 removes and stores the metadata. If the metadata contains incentives, the incentives are stored in table format in storage 306, which corresponds to table 222 of memory 220. Storing the incentives in table format provides control program 304 the ability to perform a quick look-up of incentives according to the time an event occurs. The program content is sent to display 310 for presentation to the user. When the user attempts to change the channel or otherwise turn off the presently displayed programming, control program 304 receives a signal indicating the attempted change. Control program 304 then goes to the stored incentives 306. If the time period corresponding to the signal contains an incentive, control program 304 retrieves the incentive, then sends the incentive to display 310. The incentive presented in display 310 provides the user with a reason to "stay tuned" and not actually change the channel or turn off the displayed programming.

With reference now to FIG. 4A, an XML file used to transmit incentives for a program is shown in an exemplary embodiment of the present invention. In this example, XML file 400 is a configuration file, set off by delimiters <config>. Within file 400, the program to which the incentives apply is shown as the "Tonight Show with Jay Leno" 404. Additionally, two incentives are shown in this file. First incentive 404 starts at time "0" and ends at time "120". In this exemplary embodiment, the file provides start and stop times in seconds, although these times may also be provided in any other segment of time, such as hours or minutes. Incentive 404 is a teaser stating, "Brad Pitt will be making a surprise appearance in 10 minutes". Second incentive 406 starts at time "2400" and ends at time "3000". This incentive notes, "You will miss Dave Mathers Band playing their new song". Additional incentives (not shown) may also be provided for different time periods throughout the program. Note that not all time periods have incentives. For example, this file provides no incentives for the time period between 120-2399 seconds. Additionally, if we assume this set of incentives covers one hour, no incentive is provided for the last 10 minutes of the hour.

With reference now to FIG. 4B, a table of incentives 408, formed from XML file 400 is shown in accordance with an exemplary embodiment of the present invention. Table of incentives 408 corresponds to table 222 of FIG. 2. As illustrated, each entry in table 408 consists of a time period 410 and an incentive 412. Four entries are shown in this example. Entry 414 has been created from incentive 404; this entry covers a time period between 0-120 and contains the first incentive from XML file 400. Third entry 418 in table 408 was created from incentive 406 of file 400; this entry covers time period 2400-3000 and contains the second incentive from XML file 400. Second entry 416 covers time period 121-2399, when no incentives are specified in XML file 400. A null entry has been created for this time period. Fourth entry 420 covers time period 3001-3600; again no incentives are specified, to the entry is null. Alternatively, only those time period for which incentives are provided will be placed in table 408. In this alternate embodiment, there would be no match for a search on the time period 120-2399. Another possibility, not specifically shown, is that a global incentive may be designated for an entire program or an entire channel and may be presented to the user whenever no other incentive is active. Alternatively, the global incentive may also be presented in conjunction with time-dependent incentives.

The embodiment above assumes a one-hour program (3600 seconds). In an alternate exemplary embodiment, incentives are not accessed by the elapsed time into a program, but the time of day of the broadcast. By this means, a channel that wishes to a user to remain on that channel for an extended period can provide incentives between programs for programming later in the day.

With reference now to FIG. 4C, an alternate version of an XML file used to transmit incentives is shown in an exemplary embodiment of the present invention. In this example, configuration file 422 is defined for an infomercial 424 and again contains two incentives. A first incentive 426 starts at time 120 and ends at time 1200 and contains an offer stating, "Watch for 2 more minutes and you'll receive 10% off". A second incentive 428 starts at time 1200 and ends at time 1800; incentive 428 also contains an offer, "Order now and receive two for the price of one". XML file 422 will be stored in a table similar to the table shown in FIG. 4B.

Figure 5:
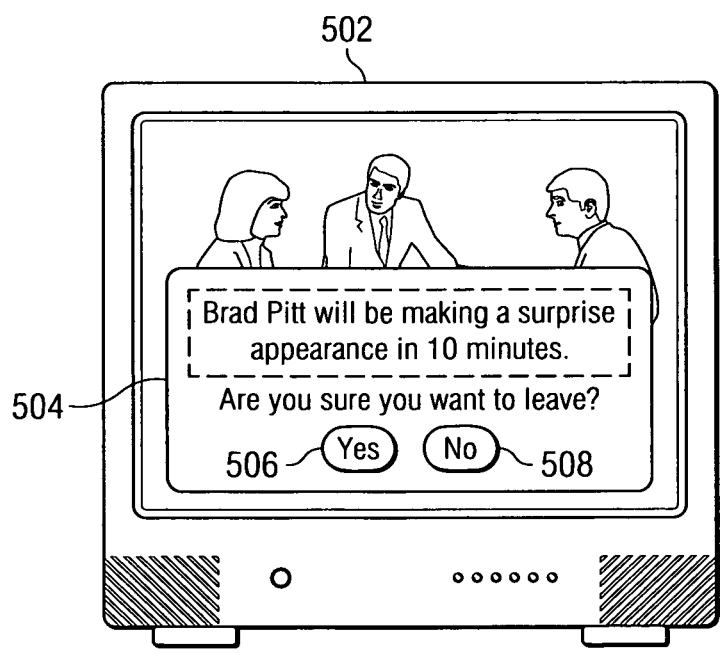
FIG. 5 shows a screen shot of a pop-up window used to provide an incentive in an exemplary embodiment of the present invention.

With reference now to FIG. 5, a sample pop-up window requiring user input is shown in accordance with an exemplary embodiment of the present invention. In this example, screen 502 is tuned to a program associated with the incentives of FIGS. 4A and 4B. Within the first two minutes of the broadcast, the user attempts to change channels. Because there are incentives associated with this time period, pop-up window 504 is displayed, presenting the first incentive for this program. The user is then asked to verify whether they really want to leave the present channel, while buttons to respond "Yes" 506 or "No" 508 are also presented.

With reference now to FIG. 6, a flowchart for processing incentives in response to user input changing programming is shown in accordance with an exemplary embodiment of the present invention. The process illustrated in FIG. 6 may be implemented in control program 304 in FIG. 3.

The process begins when the user turns the television or other device on to a specific channel. Content and incentives are received from the content provider (step 602), and the process stores the incentives (step 604) according to the time for which they are effective. Although the illustrative examples assume to this point that the content and incentives are received at the same time, this is not a requirement. For example, a content provider may periodically provide a table containing a large number of incentives to the user device, e.g., hourly, daily, or weekly. The exact manner in which the incentives are provided to the user device may be altered in a number of ways. When content is received, the process displays the content for the user on the display (step 606). This display may be, for example, a television or computer screen. A control program, such as control program 304 in FIG. 3 runs on a processor and then monitors a user interface, such as processor 206 and user interface 212 of FIG. 2, in order to detect an attempt to change the program viewed (step 608). Provided there is no attempt to change the program ("No" to step 608), the flow keeps returning to step 606, so that content is displayed and user input is monitored. When the user attempts to change the program ("Yes" to step 608), the control program determines if there is an incentive corresponding to the time the attempt occurs (step 610).

If there are no active incentives ("No" to step 610), the control panel determines whether the user selected a different channel or turned the user device off (step 620). If the user is turning the device off ("Off" to step 620), the process terminates thereafter. If the user attempts a change of channel ("Change" to step 620), the channel change will occur (step 622) and the flow returns to step 602, where new content and new incentives are received for the new channel.

Returning now to step 610, if there is an incentive present ("Yes" to step 610), the control program then retrieves the incentive corresponding to the elapsed time of the program (step 612) and displays the incentive on a pop-up window (step 614). After viewing the incentive, the user must then indicate whether they still want to leave the current programming (step 616).

If the incentive does not motivate the user to remain, so that the user responds in the affirmative to the question of leaving the program ("Yes" to step 616), the normal action initiated by the user is allowed to proceed to step 620, where the control program determines whether the action was to change channels or to turn the device off (step 620). If the user is turning off the device ("Off" to step 620), the process terminates thereafter. If the user is changing channels ("Changed" to step 620), the channel change occurs (step 622) with the process returning to step 602, where new content and new incentives are received for the new channel.

Returning to step 616, if the user replies in the negative to the question of leaving the current content ("No" to step 616), control program 304 processes the incentive (step 618) and the flow then returns to the display of content in step 606.

Processing the incentive may only require that the pop-up window display is terminated. This type of processing would occur, for example, when the inventive is a statement about upcoming features in the program, such as the teaser in FIG. 5. When the incentive is an offer, such as the discount offered in incentive 426 of FIG. 4C, processing the incentive may require that the control program instructs the user how to redeem the discount. In at least one embodiment, use of the incentive can be combined with demographic information that is stored on the user device, making the incentive more personal.

In two alternate embodiments, multiple incentives can be provided for a given time period. In the first embodiment having multiple incentives, all of the multiple incentives are presented to the user when a triggering event is detected. In an alternate embodiment, only the first incentive is offered to the user. If the user declines the offer, a second offer is then displayed, providing a greater incentive to remain.

As explained in the exemplary embodiments above, the present invention provides a means by which a content provider can display an incentive to retain the user's attention on the current channel or program. When the user attempts to change the programming, a pop-up window displays the incentive and the user must respond in either the affirmative or the negative in order to proceed.

The invention has been described in terms of retaining viewers on a broadcast channel. Although a broadcast media is the most pertinent use, the invention could also be used in the context of stored broadcasts, such as DVDs to provide incentives for the viewer to watch the entire program.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-readable storage device providing program code for use by or in connection with a computer or any instruction execution system. For the purposes of this description, a computer readable storage device can be any tangible apparatus that can store the program for use by or in connection with the instruction execution system, apparatus, or device.

The storage device can be an electronic, magnetic, optical, electromagnetic, or semiconductor system (or apparatus or device). Examples of a computer-readable storage device include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The terms "computer-readable storage device" and "computer-readable storage devices" do not mean signal propagation media such as a copper transmission cable, optical transmission fiber or wireless transmission media.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for encouraging a user to continue viewing content of a broadcast channel currently being played on a video device of the user, the method comprising:

detecting, by a processor, playing of the content on the user video device, the user video device capable of playing the content from the broadcast channel and other content from a multiplicity of other broadcast channels depending on a channel selection on the user video device;

responsive to the processor receiving a user request to (a) switch the user video device from the currently played broadcast channel to another of the broadcast channels or (b) turn off the user video device, determining, by the processor, a description of an event which will not immediately follow but will subsequently occur in the content of the currently played broadcast channel, and in response, delaying the requested switch of the broadcast channel or the requested turn off of the user video device and instead displaying the description of the event as an encouragement to the user to continue playing the content of the broadcast channel on the user video device; and wherein the event is predetermined to be a highlight of the content of the currently broadcast channel.

2. The method of claim 1 wherein the content is a program broadcast by the broadcast channel to the user video device, the event occurs at a specified time in the program, and wherein the description of the event occurring at the specified time in the program of the currently broadcast channel is specific information about what is coming up in the program at the specified time.

3. The method of claim 1 wherein the content at least includes a current program and a later program that are broadcast by the broadcast channel to the user video device, the event occurs at a specified time in the later program, and wherein the description of the event occurring at the specified time is specific information about what is coming up in the later program after the current program.

4. The method of claim 1, wherein the step of displaying the description of the event to as the encouragement to the user to continue playing the content of the broadcast channel on the user video device further comprises displaying an amount of time remaining before the event occurs.

5. The method of claim 1 wherein the event occurs at a specified time, and further comprising:

responsive to the processor receiving the user request, determining, by the processor, whether the specified time of the event has passed and if so the processor delaying the user request and instead displaying a particular encouragement to the user to continue playing the content of the broadcast channel on the user video device, wherein the particular encouragement is configured for use when no other encouragements other than the particular encouragement are active for the currently broadcast channel.

6. A computer program product for encouraging a user to continue viewing content of a broadcast channel currently being played on a video device of the user, the computer program product comprising:

one or more computer-readable storage devices having computer readable program instructions stored thereon, the computer readable program instructions for execution by a computer, comprising:

program instructions for detecting playing of the content on the user video device, the user video device capable of playing the content from the broadcast channel and other content from a multiplicity of other broadcast channels depending on a channel selection on the user video device; and program instructions for receiving a user request to (a) switch the user video device from the currently played broadcast channel to another of the broadcast channels or (b) turn off the user video device, and in response determining a description of an event which will not immediately follow but will subsequently occur in the content of the currently played broadcast channel, and in response, delaying the requested switch of the broadcast channel or the requested turn off of the user video device and instead displaying the description of the event as an encouragement to the user to continue playing the content of the broadcast channel on the user video device, wherein the event is predetermined to be a highlight of the content of the currently broadcast channel.

7. An apparatus for encouraging a user to continue viewing content of a broadcast channel currently being played on a video device of the user, the apparatus comprising:

one or more processors, one or more computer-readable memories, and one or more computer-readable storage devices;

first program instructions to detect playing of the content on the user video device, the user video device capable of playing the content from the broadcast channel and other content from a multiplicity of other broadcast channels depending on a channel selection of the user video device; and second program instructions to receive a user request to (a) switch the user video device from the currently played broadcast channel to another of the broadcast channels or (b) turn off the user video device, and in response determine a description of an event which will not immediately follow but will subsequently occur in the content of the currently played broadcast channel, and in response, delay the requested switch of the broadcast channel or the requested turn off of the user video device and instead display the description of the event as an encouragement to the user to continue playing the content of the broadcast channel on the user video device, wherein the event is predetermined to be a highlight of the content of the currently broadcast channel, and wherein the first program instructions and the second program instructions are stored on the one or more computer-readable storage devices for execution by the one or more processors via the one or more computer-readable memories.

* * * * *